Aug. 27, 1940.　　C. P. STAUFFER　　2,213,022
REPAIR CLAMP FOR PIPES
Filed Oct. 31, 1938
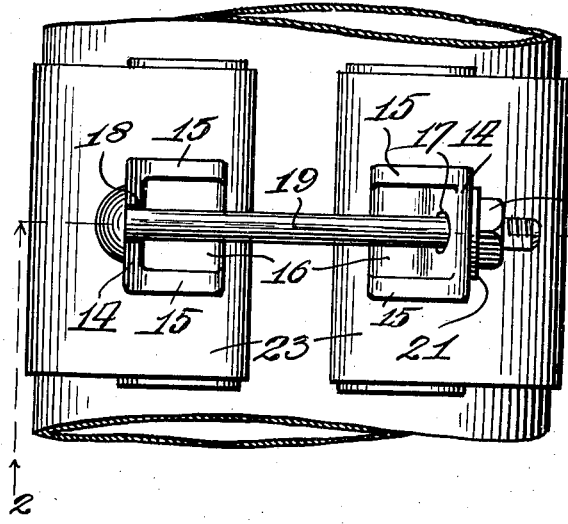
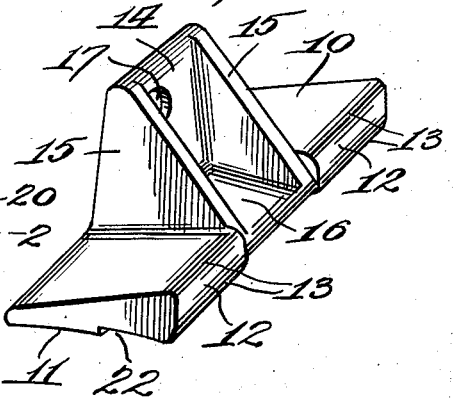
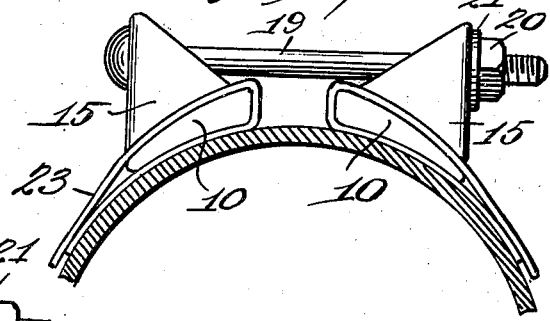
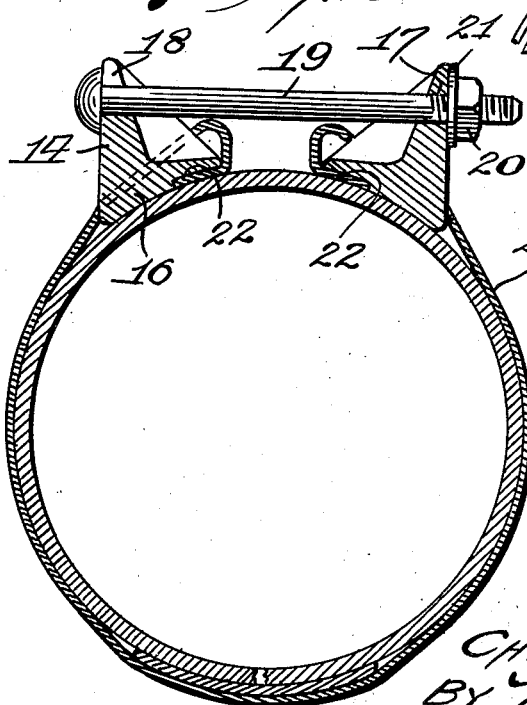
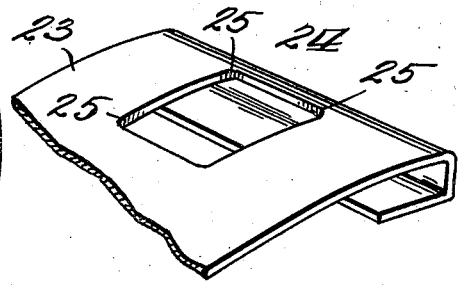
INVENTOR,
CHARLES P. STAUFFER
BY Martin P. Smith
ATTY.

Patented Aug. 27, 1940

2,213,022

UNITED STATES PATENT OFFICE 2,213,022

REPAIR CLAMP FOR PIPES

Charles P. Stauffer, Bell, Calif.

Application October 31, 1938 Serial No. 237,967

1 Claim. (Cl. 138—99)

My invention relates to a repair clamp for pipes and the construction herein disclosed is an improvement upon the repair clamp forming the subject matter of U. S. Letters Patent No. 1,907,889 issued to me May 9, 1933.

The principal objects of my present invention are, to generally improve upon and simplify the construction of the repair clamp disclosed in my aforesaid Letters Patent, as well as other existing forms of similar clamps, to provide a clamp of relatively simple, practical and inexpensive construction that may be easily and quickly applied to pipes utilized as conduits for water, gas, steam, air, or other fluids and liquids, for the purpose of effectively closing and sealing cracks, breaks, or punctures that may develop in said pipes.

A further object of my invention is, to provide a repair clamp of the character referred to having a pair of blocks that rest directly upon the pipe that is being repaired, said blocks being constructed so as to provide firm, positive anchorage for a band of thin sheet metal or the like that passes around the pipe and overlies the crack, break, or puncture therein, and said blocks being connected by a bolt and nut that constitute means for drawing the blocks toward each other and thereby tighten the encircling repair band upon the pipe.

A further object of my invention is, to provide a pipe repair clamp utilizing a pipe encircling band and the ends thereof being shaped so that they pass partially or entirely around the blocks that are utilized in drawing the ends of the band together and, said encircling band being provided adjacent its ends with apertures for the reception of lugs that are formed on the blocks and which construction, in addition to facilitating the assembly of the blocks and the encircling band, provides a very strong and substantial connection between said band and blocks.

With the foregoing and other objects in view, my invention consists in certain novel features of construction and arrangement of parts that will be hereinafter more fully described and claimed and illustrated in the accompanying drawing in which:

Fig. 1 is a top plan view of a repair clamp of my improved construction positioned on a pipe.

Fig. 2 is a cross section taken on the line 2—2 of Fig. 1.

Fig. 3 is a perspective view of one of the blocks that are mounted on the ends of the pipe encircling band.

Fig. 4 is a perspective view of the end portion of the pipe encircling band forming a part of my improved repair clamp.

Fig. 5 is an end elevational view of a modified form of the clamp in position upon a pipe.

Referring by numerals to the accompanying drawing and particularly to the construction illustrated in Figs. 1 to 4 inclusive which illustrate a preferred embodiment of my invention, 10, 10 designate blocks preferably formed from cast metal, which blocks are substantially identical in size, form and construction, each block having a flat upper face and an under face 11 that is curved to correspond with the curvature of the pipe to which the repair clamp is applied.

One side of the block and which may be termed the inner side is somewhat greater in thickness than the opposite side, so that in cross section the block gradually decreases in thickness from its inner to its outer side.

The corners between the top and bottom surfaces of the block and the relatively wide front edge 12 thereof are rounded as designated by 13 and which rounded corners have short radii.

Formed integral with and projecting upwardly from the central portion of the block 10, is a substantially triangular lug including a wall 14 that extends for a short distance along the narrow rear edge of the block 10 and spaced side walls 15 that extend from the sides of wall 14 forwardly to the wide front side of the block. The walls 15 are substantially triangular in shape and that portion 16 of the block, between the lower portions of said walls 15, is decreased in thickness in order to lighten the weight of the block.

Two of the blocks as just described are utilized in each clamp and formed in the wall 14 of the lug that projects upwardly from one of the blocks is an aperture 17 and, a short slot 18 open at its upper end is formed through the wall 14 of the other block.

Obviously, both walls 14 may be provided with apertures such as 17 or, with the slots such as 18.

A bolt 19 passes through aperture 17 with the headed end portion of said bolt passing through the slot 18 and mounted on said bolt outside the wall that is provided with the aperture 17 is a nut 20 and a washer 21.

The under face of the thick side of each block 10 is cut away lengthwise of the block to form a continuous notch or recess 22, which is for the purpose of receiving the folded under end of the sheet metal member that encircles the pipe to which the repair clamp is applied.

The pipe encircling member designated by the numeral 23 is preferably formed of thin sheet metal having a certain degree of flexibility, for instance, copper, and formed in said member adjacent its ends are substantially rectangular openings 24 of such size as to receive the base portions of the triangular lugs comprising the walls 14 and 15 that project upwardly from the blocks 10.

The width of the metal sheet 23 is approximately equal to the length of the blocks 10 and, as the width of the lugs comprising the walls 14 and 15 is considerably less than the length of the blocks 10 there is considerable material in those portions of the sheet to the sides of the lug receiving openings 24.

In order to counteract tendency of the metal to tear at the corners of the apertures 24 as a result of strains impressed on the encircling band when tightened upon a pipe, the corners of the apertures are rounded as designated by 25.

In applying the encircling band to the blocks, the latter are positioned beneath the end portions of the band and moved upwardly so as to position the lugs comprising the walls 14 and 15 in the openings 24. Thus, the end portions of the band overlie the blocks 10 and those portions of the band beyond the openings that are occupied by the triangular lugs are bent downward into close contact with the wide front edges 12 of the blocks and the rounded corners 13 thereof and, the terminal portions of the band are bent and fitted into the longitudinally disposed grooves or recesses 22.

After a patch of rubber, leather, composition, or the like, is positioned over the break or rupture in the pipe, the band 23 is positioned around the pipe so as to overlie the patch and after the blocks on the ends of the band are brought into position adjacent each other, bolt 19 is inserted through aperture 17 and the slot 18 and, the nut and washer are now positioned upon the projecting threaded end of the bolt.

As the nut is tightened on the bolt the blocks 10 will be drawn toward each other, thus tightly clamping the encircling band upon the pipe to accomplish the desired results. The ends of the encircling band that are positioned in the grooves or recesses 22 will be clamped against the external surface of the pipe to which the device is applied and such clamping effect together with the friction produced as result of contact of the band with the upper surfaces of the blocks 10, the wide front edges 12 of said blocks and the rounded edges 13 of short radii will effectually prevent any relative slippage between the band and the blocks and consequently, a very firm and substantial connection is formed between these parts.

In the modified construction illustrated in Fig. 5, the longitudinally disposed grooves or recesses 22 are dispensed with and the end portions of the pipe encircling band are extended a sufficient distance beyond the blocks 10 to entirely underlie the same and to underlie and make contact with portions of the band beyond the blocks.

This construction provides a very tenacious joint between the band and the blocks and if desired, the underlying end portions of the band may be spot-welded to the overlying portions before the band is applied to the pipe.

Thus it will be seen that I have provided a repair clamp for pipes that is relatively simple in construction, inexpensive of manufacture, capable of being easily and quickly applied to or removed from a pipe or other conduit and the repair clamp being very effective in the performance of its intended functions.

It will be understood that minor changes in the size, form and construction of the various parts of my improved repair clamp for pipes, may be made and substituted for those herein shown and described, without departing from the spirit of my invention, the scope of which is set forth in the appended claim.

I claim as my invention:

In a repair clamp for pipes, a pair of blocks, a lug projecting upwardly from the central portion of each block, means passing through said lugs for drawing the blocks toward each other, the under faces of the blocks being transversely curved to conform to the curvature of the pipe to which the blocks are applied, said blocks being substantially wedge-shape in cross section, the under faces of the thick portions of said blocks being cut away to provide longitudinally disposed recesses, a band of flexible material adapted to encircle the pipe to which the blocks are applied, the end portions of said band being provided with openings for the reception of the lugs on the blocks and the end portions of which band pass around the thick portions of said blocks and into the longitudinally disposed grooves in the under faces of said blocks so as to occupy positions between the thick portions of the blocks and the pipe to which the clamp is applied.

CHARLES P. STAUFFER.